United States Patent [19]
Thomas

[11] Patent Number: 5,311,700
[45] Date of Patent: May 17, 1994

[54] CONTAINER FOR PLANTS

[76] Inventor: Johnny D. Thomas, 7459 County Rd. 130, Enterprise, Miss. 39330

[21] Appl. No.: 771,869

[22] Filed: Oct. 7, 1991

Related U.S. Application Data

[63] Continuation-in-part of Ser. No. 467,047, Jan. 18, 1990, abandoned.

[51] Int. Cl.⁵ .............................................. A01G 23/04
[52] U.S. Cl. ................................................. 47/76
[58] Field of Search .................. 47/66, 67, 72, 73, 75, 47/76, 78, 74; 220/19

[56] References Cited

U.S. PATENT DOCUMENTS

| | | | |
|---|---|---|---|
| 2,942,823 | 6/1960 | Chapman | 47/78 |
| 3,080,680 | 3/1963 | Reynolds | 47/74 |
| 3,134,196 | 5/1964 | Hansen | 47/76 |
| 3,316,675 | 5/1967 | Cartwright, Jr. | 47/76 |
| 3,755,964 | 9/1973 | Rack | 47/74 |
| 3,979,856 | 9/1976 | Belcher | 47/76 |
| 4,062,148 | 12/1977 | Edmonds, Jr. et al. | 47/76 |
| 4,098,021 | 7/1978 | Gruber | 47/66 |
| 4,140,257 | 2/1979 | Peterson | 47/73 |
| 4,223,480 | 9/1980 | Welty | 47/78 |
| 4,250,664 | 2/1981 | Remke | 47/76 |
| 4,517,764 | 5/1985 | Dedolph | 47/74 |
| 4,884,367 | 12/1989 | Lawton | 47/73 |
| 4,891,905 | 1/1990 | Stolz | 47/66 |
| 5,018,300 | 5/1991 | Chiu et al. | 47/72 |

FOREIGN PATENT DOCUMENTS

| | | | |
|---|---|---|---|
| 1061564 | 4/1979 | Canada | 47/76 |
| 2505674 | 8/1976 | Fed. Rep. of Germany | 47/76 |

Primary Examiner—Henry E. Raduazo
Attorney, Agent, or Firm—Alexander Norcross

[57] ABSTRACT

An improved container for growing and holding plants for transplanting encloses the root ball in a polyurethane liner, which is then supported within a wire mesh outer basket. The polyurethane liner does not rot above ground, yet is permeable, so that the roots in the root ball air prune, forming extensive fine filamentary root growth, significantly improving the viability and health of the plant when transplanted. Although the liner of the invention does not rot above ground, it easily passes roots when the basket and root ball is planted, As a result, the basket and liner need not be removed prior to planting the plant, significantly simplifying handling of the plant.

9 Claims, 12 Drawing Sheets

CUT AWAY BASKET SECTION

FIG. 1

BIRD'S EYE VIEW

FIG. 2

WIRE BASKET WITH FALSE BOTTOM

AIR PRUNING DETAIL

FIG. 9

INSTALLATION

CONTAINER FOR PLANTS

This is a continuation-in-part of my prior pending application Ser. No. 07/467,047, filed on Jan. 18, 1990, now abandoned.

BACKGROUND OF THE INVENTION

This invention relates to the field of baskets or pots for potting nursery plants. Such containers hold soil or a growth medium, and serve to support and restrain the plant root structure from its initial sprouting through continued growth. The container also provides for ready transportation of the plant, and should provide for easy transplanting of the plant into the ground.

U.S. Pat. No. 4,223,480 to Welty is the closest known prior art in regards to removable inner liner for potting a plant and transplanting the same. This patent discloses a perforated, sectionalized liner made of flexible material, folding upwards or away from a base member. A group of finger members permits the ready removal of the enclosed liner with its contained potting soil and root ball from a pot and the subsequent removal of the root ball from the liner.

U.S. Pat. No. 2,960,798 to Linstaedt discloses a nursery pot constructed of an outer metal mesh reinforcing material and having, as a liner, tar paper (asphaltum felt). This construction provides an impermeable, decoratable pot.

U.S. Pat. No. 4,106,235 to Smith discloses a two section, inner and outer pot construction where roots are intended to grow through the inner pot mechanism. However, this structure is designed specifically for hydroponics and utilizes a porous inner pot bottom (screen) through which the roots can grow into a hydroponic medium.

U.S. Pat. No. 2,142,324 to Magyar, Jr. discloses a potting system in which a pot liner is provided with an inner and outer sleeve, rotatable to permit the plant roots to extend through the walls of the pot. The entire construction is rotated open for transplanting and planted, pot, root ball and all. The pot of this patent is therefore properly considered part of the root ball.

U.S. Pat. No. Des. 250,940 discloses a visual depiction of a Plant Container having a spaced distance from an inner liner to the base of the container.

U.S. Pat. No. Des. 255,555 likewise discloses a pot having an apparently porous inner liner spaced a distance from the bottom of the pot and additionally apparently includes tubes vertically ascending from the base of the pot through the screen into the upper, root ball area of the pot which are hollow and which have periodically spaced holes.

U.S. Pat. No. 879,613 to Edwards discloses an early transplanting basket in which the root ball is suspended within a coarse metal mesh basket. The entire outer surface of the root ball is exposed to the air rather than just those root tendrils which penetrate through the lining.

U.S. Pat. No. 4,027,429 discloses another form of pot in which an inner ring within the base of the pot creates a spaced annular water reservoir in the bottom of the pot upon which is placed, loosely, a soil supporting disk which supports the soil and the plant. The bottom of the pot is open and the disk can be pushed upward through the bottom of the pot to remove the soil or root ball for planting.

None of these patents disclose a structure in which the soil is contained within a permeable soft plastic membrane, enclosing the root ball but through which the roots can grow, permitting roots to air prune at the far tips only without exposure of the rest of the root system within the root ball to air, the ball being supported within a wire basket which minimizes inhibition of root growth, but which supports the liner and its contained liner with root ball for free air circulation.

SUMMARY OF THE INVENTION

A container for starting plants intended to be transplanted is a combination of:

A relatively squat, substantially open mesh external basket generally wider than it is high, and preferably with a taper, so that successive baskets may be nested in storage.

The basket should have a false bottom, defining an open, air filled space between the bottom of that part of the basket which contains the root ball and the ground, or, in an alternate embodiment, it should have an impermeable bottom to prevent through growth of roots.

A penetrable, water permeable liner within the basket, made of polyurethane foam.

The device contains a potting medium within the liner in which a plant is started and grown. During growth, the roots of the plant will penetrate the lining and the basket, and will then air prune, an effect that occurs when the roots of a growing plant are exposed to air. This promotes fibrous hair roots, a desirable characteristic in a plant to be replanted.

The relatively squat shape and open air space of the false bottom of the container creates more lateral root growth, which aids upright stability after transplanting.

Such enhanced lateral root growth may alternatively achieved by providing an impermeable or root impenetrable bottom to the container, so that substantially all fine root growth is lateral.

It is thus an object of the invention to provide a container for plants which enhances fine root growth.

It is a further object of the invention to provide a container for plants which enhances lateral growth of roots.

It is a further object of the invention to provide a container for plants which resists rotting while above ground.

It is a further object of the invention to provide a container for plants which reduces incidence of root bound growth.

It is a further object of the invention to provide a container for plants which enhances retention of soil in a root ball while directing and enhancing fine root growth.

It is a further object of the invention to provide a container for plants which enhances fine root growth so as to make a plant more transplant shock resistant.

It is a further object of the invention to provide a container for plants which may be transplanted intact, without inhibiting plant growth.

DETAILED DESCRIPTION OF THE PREFERRED EMBODIMENT

The drawings disclose and this description will concentrate on the preferred embodiment of the Plant Container of the invention; several significant variations are possible and will be discussed below.

Figure 1:
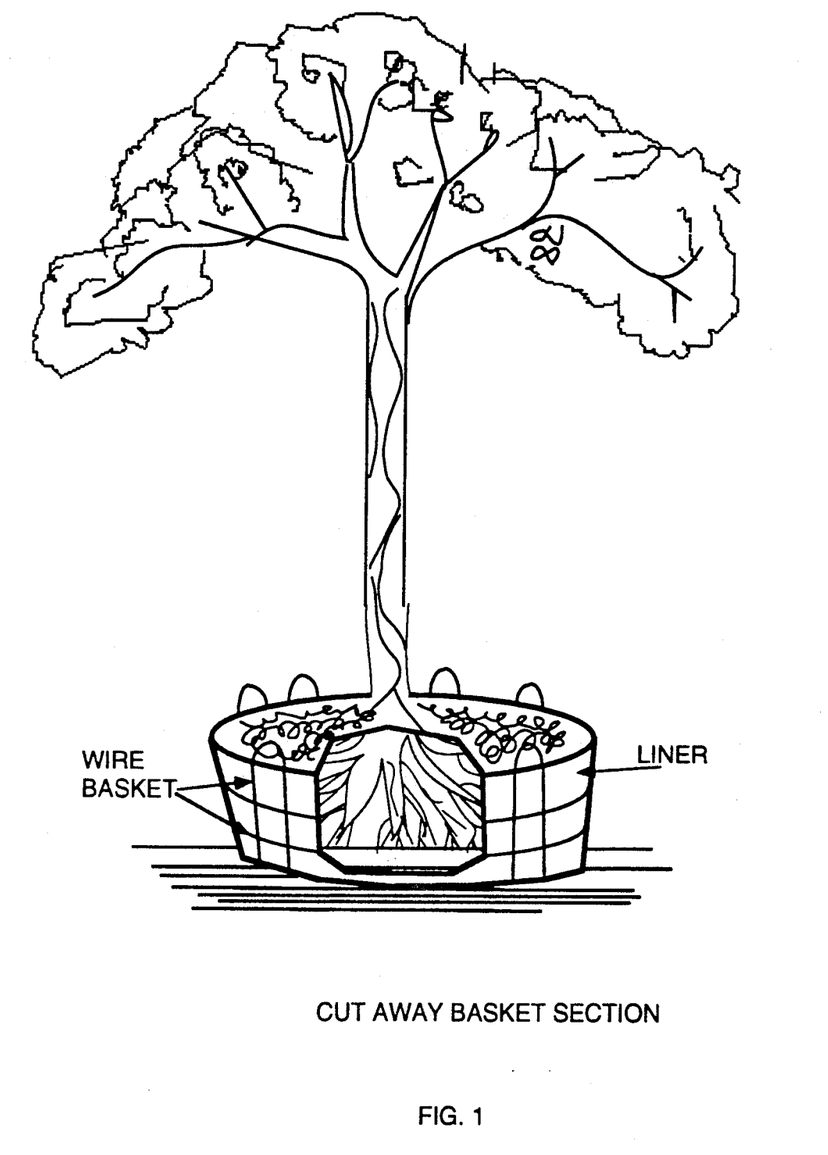
FIG. 1 is a cut away view of a Plant in the Container of the invention.

Referring to the Drawings, the Plant container 10 is used in Nursery practice to grow and sustain a plant 12 until it is transplanted into a final growing location in the ground. Such a container must contain a Root Growth Medium 14, typically soil 16 or a similar loose particulate compound, within which plant 12 grows by spreading its roots 18. The combination of Soil 16 and roots 18 is typically called a root ball 20, and the plant 12 is fertilized, watered, moved and ultimately transplanted, by handling the root ball 20.

Figure 2:
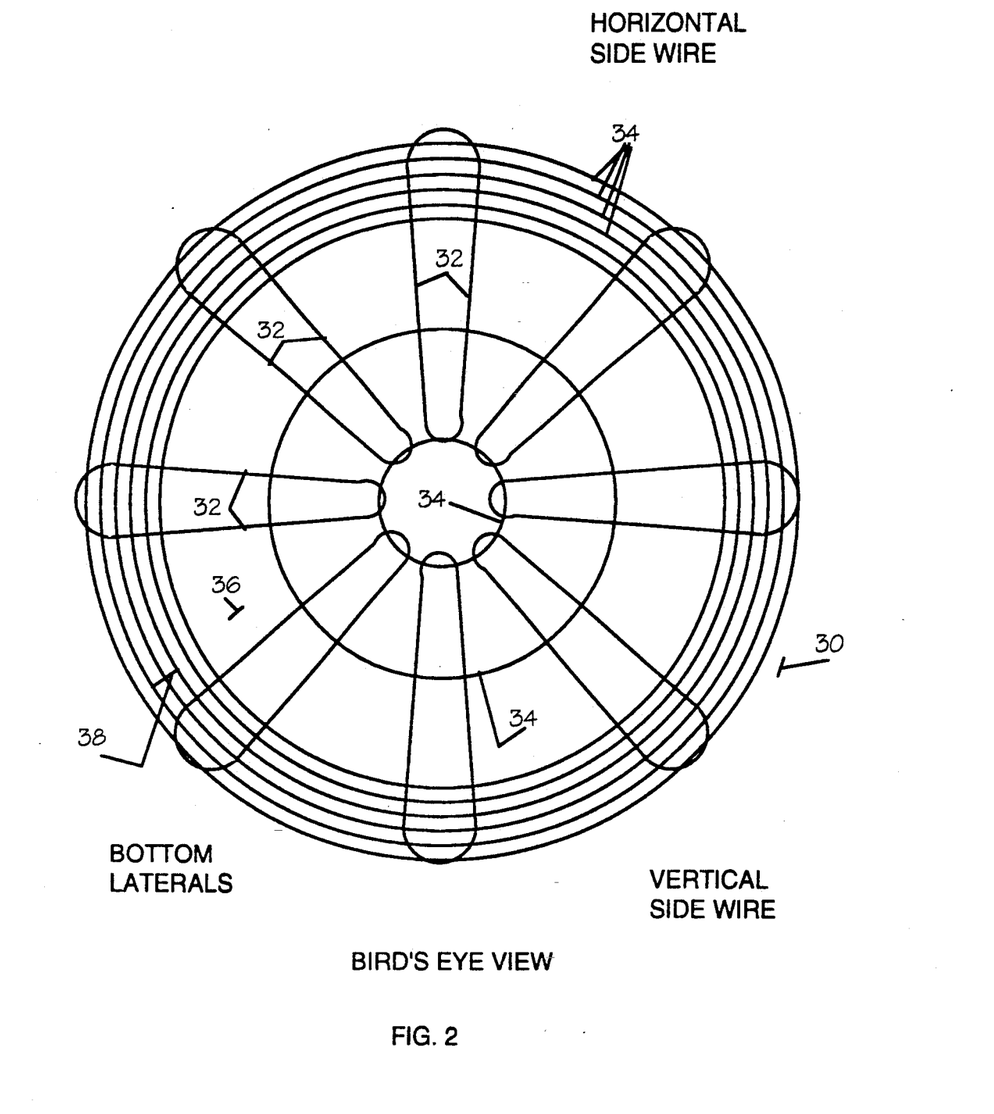
FIG. 2 is top view of the wire basket of the invention.
Figure 3:
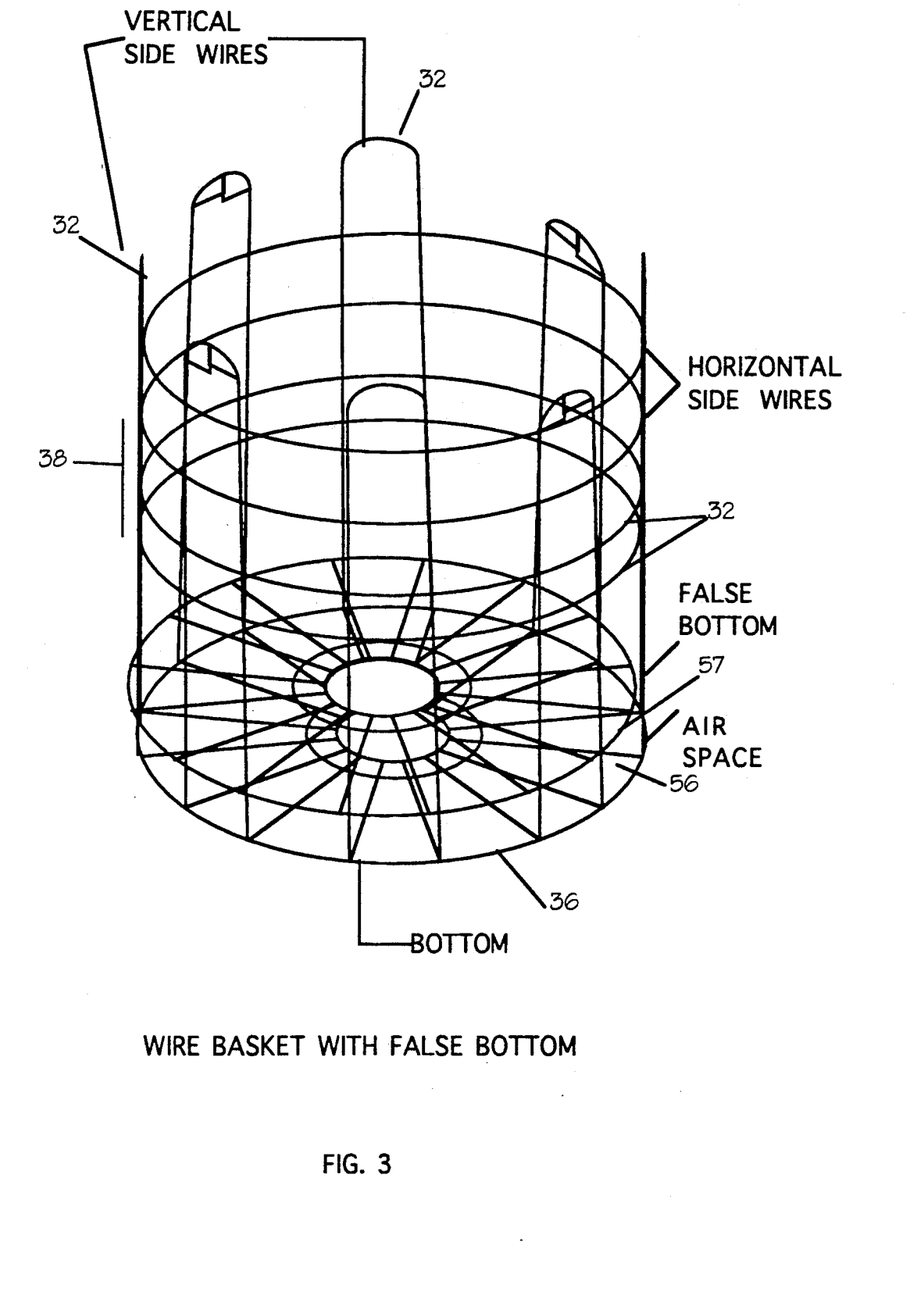
FIG. 3 is an angled view of the wire basket of the invention, showing a false bottom.

The Container 10 of the invention comprises an outer supporting means 30, formed as an open mesh construction wire basket 30, the wires forming interconnected vertical ribs 32 and horizontal rings 34 to form a basket that is typically round, arising from a bottom member 36, enclosing an interior within side member 38. This interior is formed to contain the Root Ball 20.

Wire Basket 30 may be made of either corrosion resistant or corrosion susceptible wire; the wire may be either galvanized ferrous wire of plastic or epoxy coated wire, to resist corrosion.

Alternately the basket 30 may be made of non-galvanized Ferrous wire. As the basket 30 is intended to be planted in the ground as part of the transplantation process, corroding wire is generally preferred. However some plants 12 require an extended above ground growing and storage time, and for such plants, a non-corrosive basket is preferred. The open mesh construction of the basket 30, with sizeable openings, and only sufficient wire for strength, prevents such a basket 30 from inhibiting or harming future growth of a plant, even though the basket 30 degrades slowly after being planted.

The Basket 30 is lined with a permeable, root-penetrable liner means 44. This liner means has two functions: it retains the soil 16 within the basket 30 to form the root ball 20. More important, it is the means for enhancing root growth and propagation by enhancing air pruning of the roots 18 of the plant.

Air pruning is a known phenomenon where a root within a root ball will not grow into open air. Air contact kills the tip of the root, which reacts by putting out many fibrous root extensions. Ultimately, air pruning produces a very dense, fibrous, hair root form of root ball. This produces a hardy, healthy plant, and makes survivability for transplanting very good.

The liner means 44 must then have the strength to hold the soil 16 within the basket 30 despite its generally open mesh construction. It must permit free growth through itself of roots for air pruning, and it cannot choke off or cord the roots. Finally, while it must be permeable to permit watering of the plant and control of the moisture content of the root ball, it should be reasonably non-biodegradable so that it does not rot above ground. Rotting destroys the physical integrity of the root ball 20, and is a principal problem with burlap root ball coverings.

It has been found that a polyurethane foam liner is particularly and uniquely suited to form the liner 44. The thickness of the foam is a function of the size of basket 30, with thicker foam required for strength with larger openings basket 30. Of the polyurethane foams, polyether polyurethane is preferred; it is also desirable that a UV resistant foam, commonly sold as "Blue Foam" be used in areas having intense sunlight.

Figure 5:
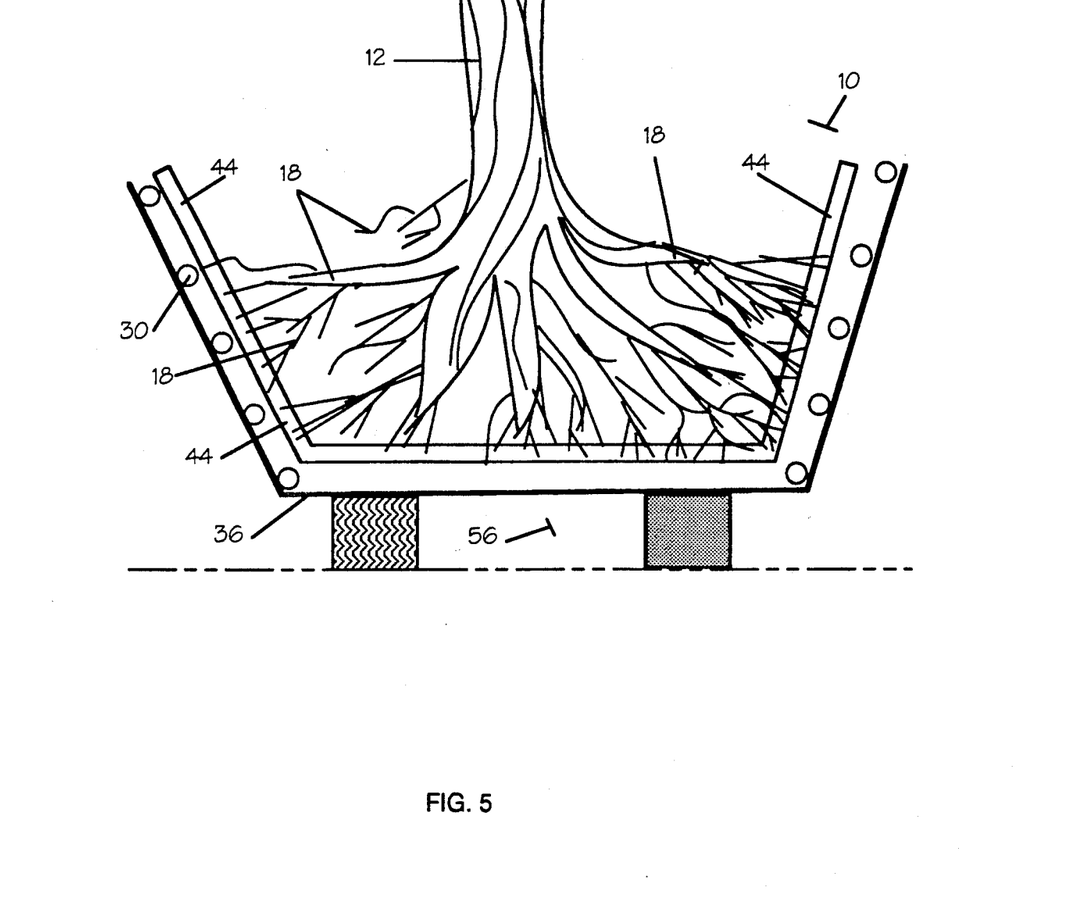
FIG. 5 is a sectioned view of the container of the invention showing the bottom spaced a distance for air circulation.
Figure 9:
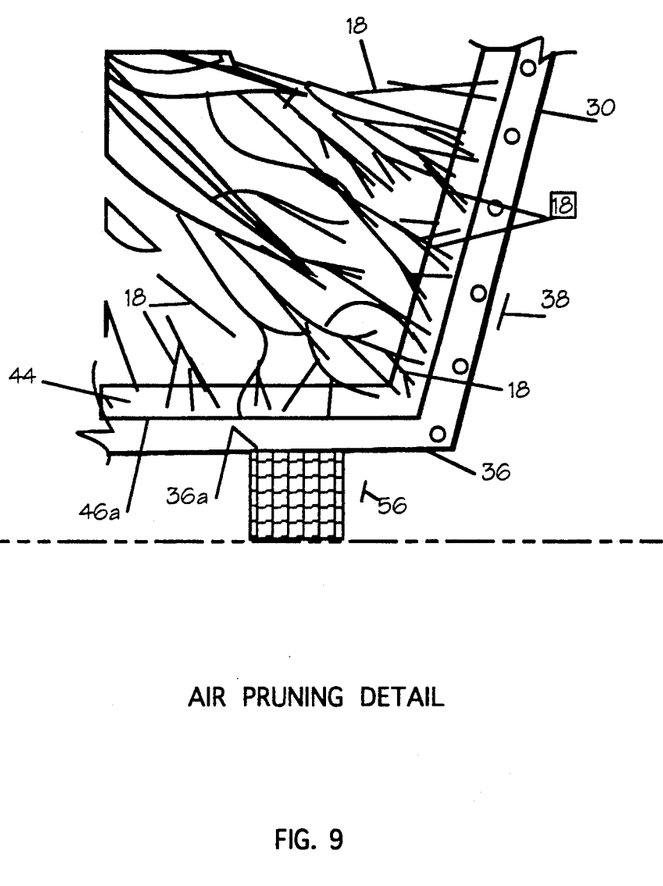
FIG. 9 is a detailed section view of air pruning of roots.

Basket 30 must further provide for air circulation or air flow 56 about the exterior 46 of liner 44 to promote air pruning. This may be as simple as placing basket 30 on spacing means 48 to provide air flow 56 about the bottom 36. Suitable spacing means could be blocks or timbers 50.

Figure 4:
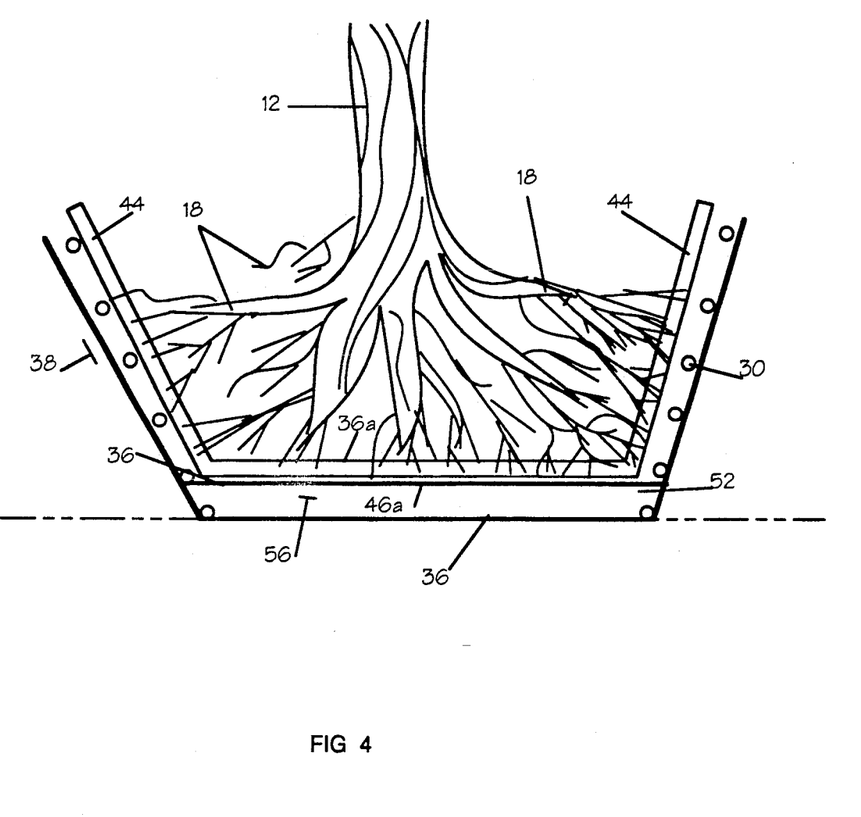
FIG. 4 is a sectioned view of the container of the invention showing a false bottom.

Preferably, spacing means 48 would be integral to basket 30. A false bottom 52 may be constructed in basket 30, by extending vertical ribs 32 in an internal loop. Alternately, separate wire ribs 33 may be interconnected within basket 30 to form false bottom 52. False bottom 52 then supports conformably liner means 44, creating a space for air flow 56 around the bottom exterior 46a of liner 44.

In such construction it is desirable to promote lateral root growth for stability of the plant 12 when transplanted. This may be readily done by shaping basket 30 so that it is wider than it is tall; air pruning will then produce lateral root growth throughout the root ball 20, causing the root structure to follow the lateral, wide shape of basket 30. Tapering the sides 38 of basket 30 is advantageous, since it permits the baskets 30 to be stacked for storage prior to use.

Figure 6:
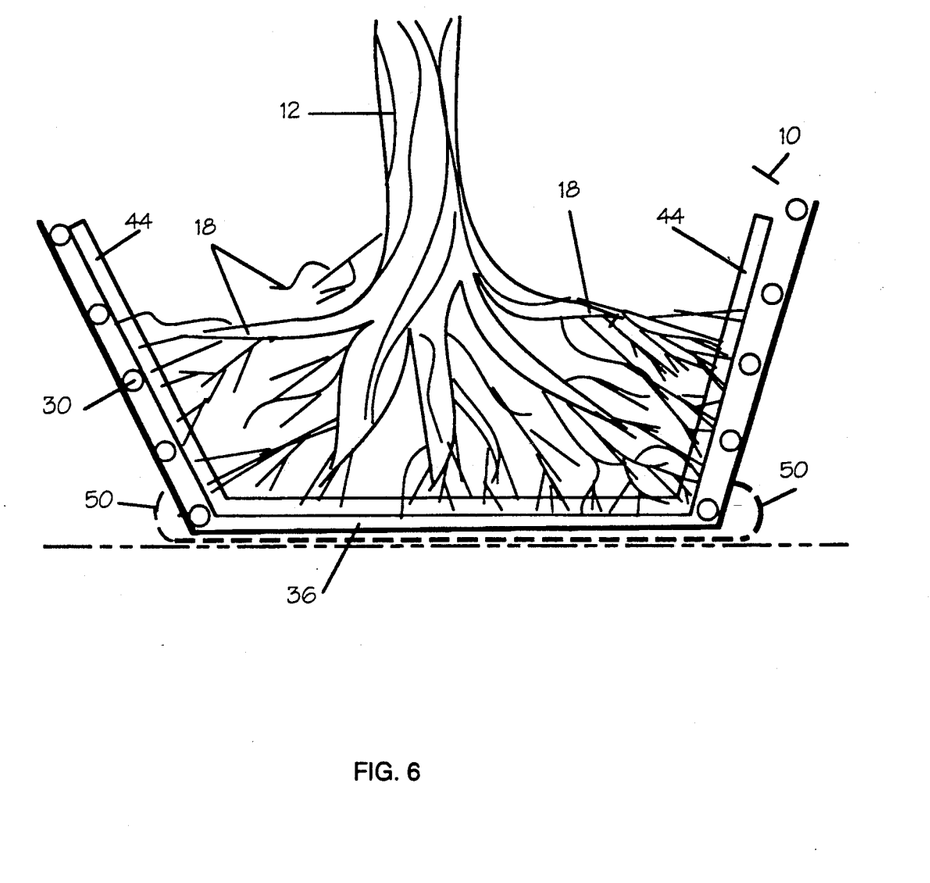
FIG. 6 is a sectioned view of the container of the invention showing a root growth resistant bottom cover of a root cording material.
Figure 7:
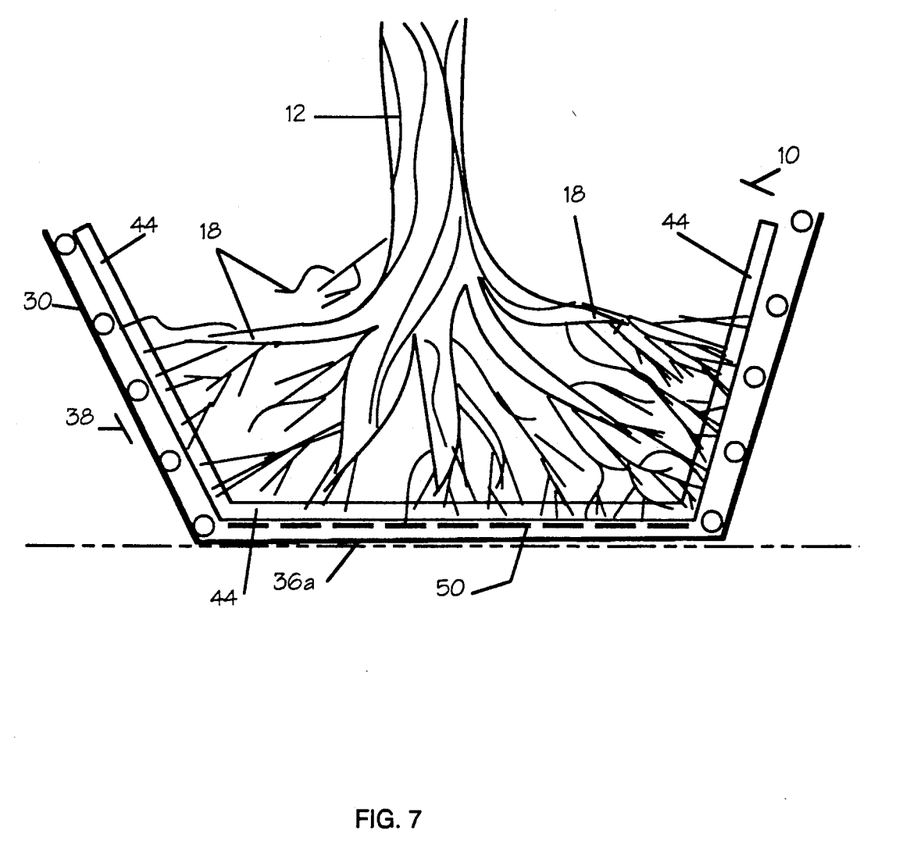
FIG. 7 is a sectioned view of the container of the invention showing a root growth resistant bottom cover of an impermeable material.
Figure 8:
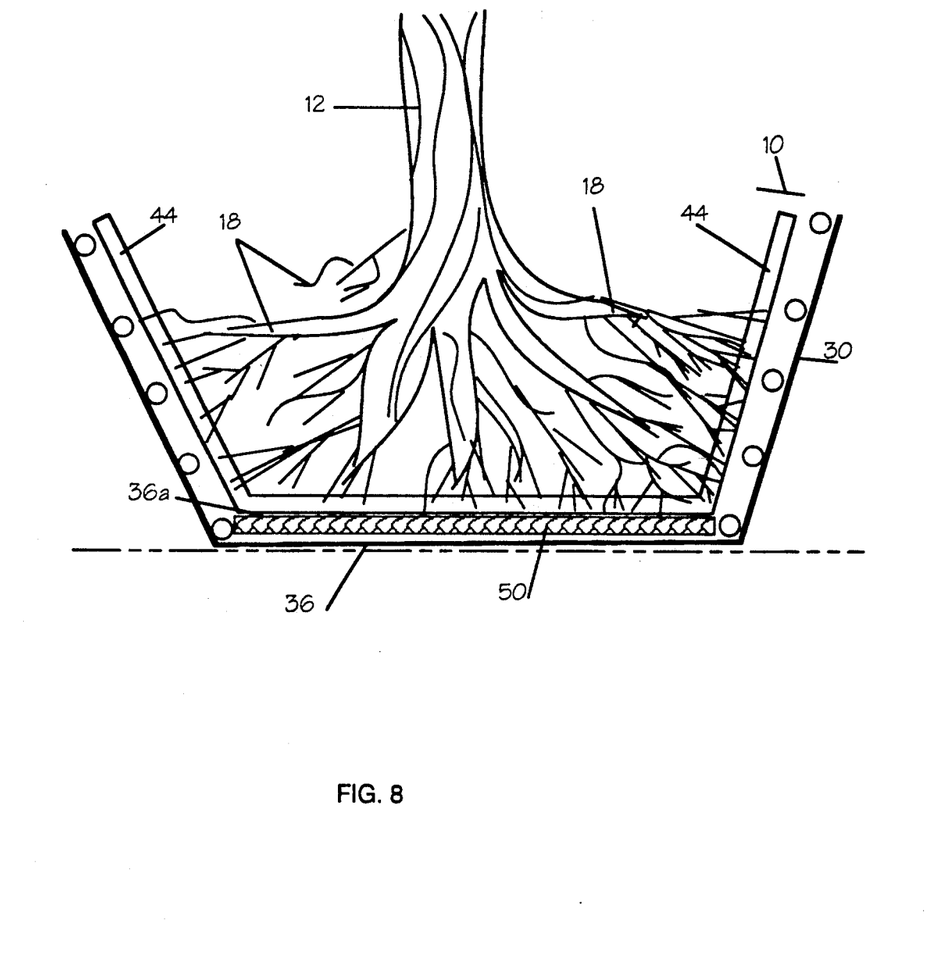
FIG. 8 is a sectioned view of the container of the invention showing a bottom lined with a biodegradable, root growth resistant material.

There are circumstances where air pruning of roots on the bottom of the root ball 20 is undesirable. The basket 30 may be modified readily for this use by eliminating false bottom 52, and either covering bottom interior 36a with an impermeable, root-growth resistant material 50 or by covering the bottom exterior 46a of the container 30 with a removable material 50 which is root-growth resistant.

In the first case, a solid, bio-degradable material may be used to cover the bottom 36a of the basket 30. Wood is a preferred such material, but either plywood, fiberboard or Masonite TM are suitable, as either will resist growth of roots, but will readily rot once buried for transplanting. The resulting container 10 will expose the liner 44 only on the sides, and the resulting root growth, with air pruning, will be lateral, producing a wide dense root ball 20.

In the second case, the bottom exterior 46a of the basket 30 (which has no false bottom 52) will be covered with a root choking material 50. A tightly woven synthetic cloth will have the necessary plurality of small non-expandable openings to prevent root penetration by killing any penetrating roots by cording, a process analogous to girdling, where a plant is killed by circumferential pressure against its growth cells, which form the outer layer of the root. Some weave is necessary so that water may drain through the cloth; the weave must be tight so that no substantial opening exists through which a root may grow. The cloth should be synthetic, since natural materials (cotton, sisal, burlap, etc.) would rot and would then promote rather than hinder root growth. Such a cloth should be removed at the time of transplanting into the ground.

A second form of root-growth resistant material 50 is that material which is not root choking, but is impervious to roots. Such materials include solid plastic sheet, preferably opaque or black plastic sheet, such as 6-mil black plastic. One source is trademarked "Visquene". Alternately, Tarred Felt, either 15 pound or 30 pound weight, would be suitable. Other solid materials would be suitable, limited only by cost, and the ease of removing the material before transplanting.

The container of the invention also reduces the plant becoming root bound, as the roots are not internally deflected during growth by a rigid or non-penetrable container wall. The root penetrates the liner, and is air pruned, not deflected back into the root ball.

Figure 11:
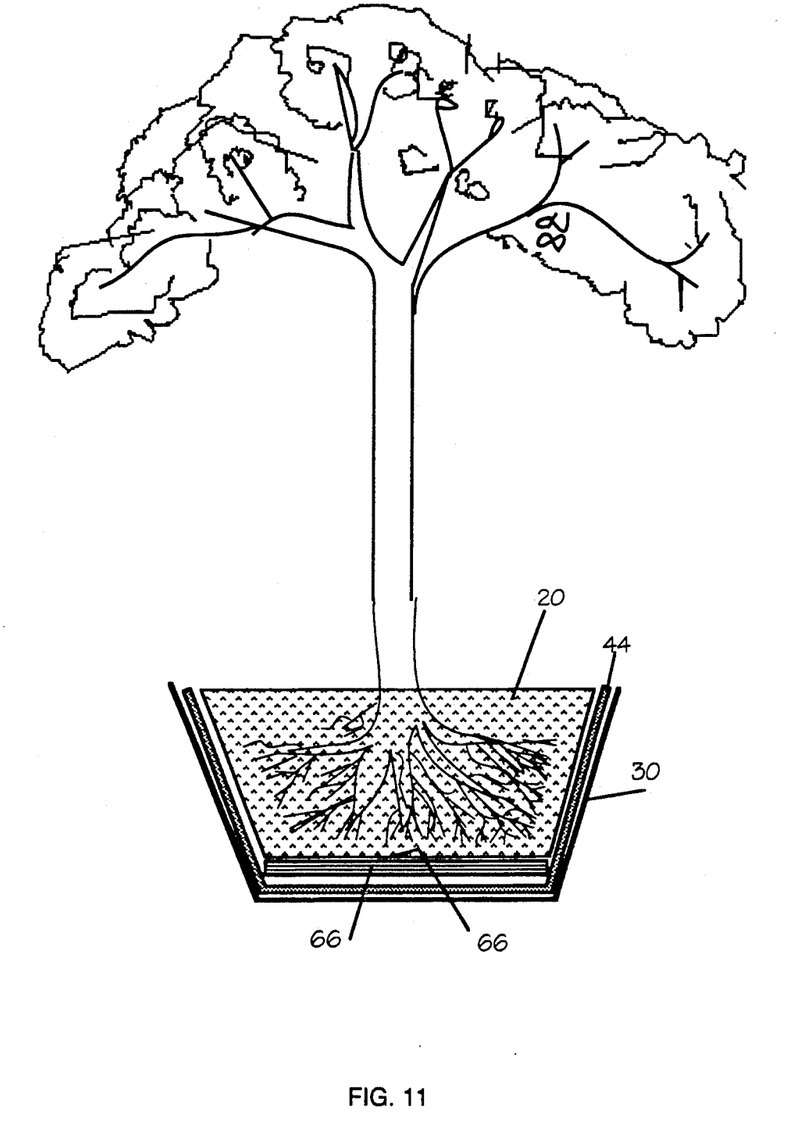
FIG. 11 is a view of a plant having a mechanically spaded root ball in a liner and basket of the invention.
Figure 12:
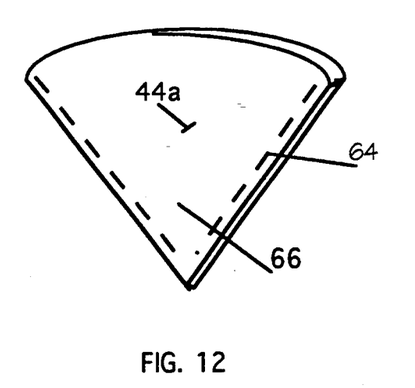
FIG. 12 is a view of a cone shaped foam liner segment.

An alternate form of the invention is shown in FIGS. 11 and 12. In the field of transplanting trees, recent mechanical developments have led to the use of large digging machines which can remove a small sapling for transplanting by spading, in a single action, the entire sapling and root ball from the ground. Such Tree spades include designs by manufacturers sold under trade names such as Vermeer, Caretree, Big John and Burkeen. Such tree spades are in the form of segmented hydraulically powered digging spades which cut and pull a root ball in the form of a truncated cone having generally a 30 degree angle.

Such mechanically spaded root balls may be in varying sizes ranging from small ornamental shrubs to large saplings. For any given tree spade, however, the size of the root ball is uniform and repeatable, and the shape of the root ball is that of a truncated cone having a 30 degree angle.

Figure 13:
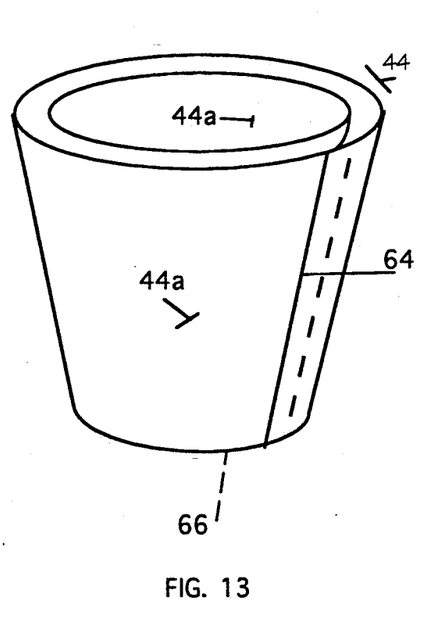
FIG. 13 is a view of a formed liner for a mechanically spaded root ball.

Once spaded out of the ground, the root ball 20 is placed in a lined basket for holding above ground until transplantation. Each mechanically spaded root ball 20 is uniform in size and shape, as determined by the size and shape of the tree spade used. Since the resulting basket 30 is cone shaped, the liner 44 of the invention can be formed as two identical cone shaped segments 44a of polyurethane foam, which are then stapled or otherwise fastened together along their edges 64 for a distance; the bottom or tip 66 of the cone shaped segments 44a are not fastened.

The resulting cone shaped liner 44 can then be placed in a supporting wire basket 30 by folding the tips 66 overlapping to each other, forming a cone shaped basket liner 44.

The field dug plant is then placed in the inventive lined basket. An advantage of the mechanically spaded root balls and the basket is that there is no requirement to back fill the basket with potting soil, pine bark or other fillers; the uniform root ball permits exact fitting to the liner basket.

When field growing and digging plants, timing becomes a problem. Digging of plants is usually done in the late fall or early spring season. Unfortunately, this is also the time when bad weather is most prevalent. The invention provides a liner which does not rot, even in the presence of excessive rain or temperature extremes. Thus plants can be dug whenever conditions, such as soil moisture and temperature, are good, and the basketed plant can then be held above ground without degradation. This provides an excellent improvement to mechanical field digging.

As with the prior embodiments, the polyurethane liner does not rot so long as the plant is above ground, and the inventive liner promotes air pruning of the roots in the root ball. Plants have now been held for beyond two years above ground in baskets having the inventive liner without rotting or degradation of the liner or root ball; when planted the roots grow easily through the liner and basket, and thus the basket, as before, does not have to be removed before planting.

Figure 10:
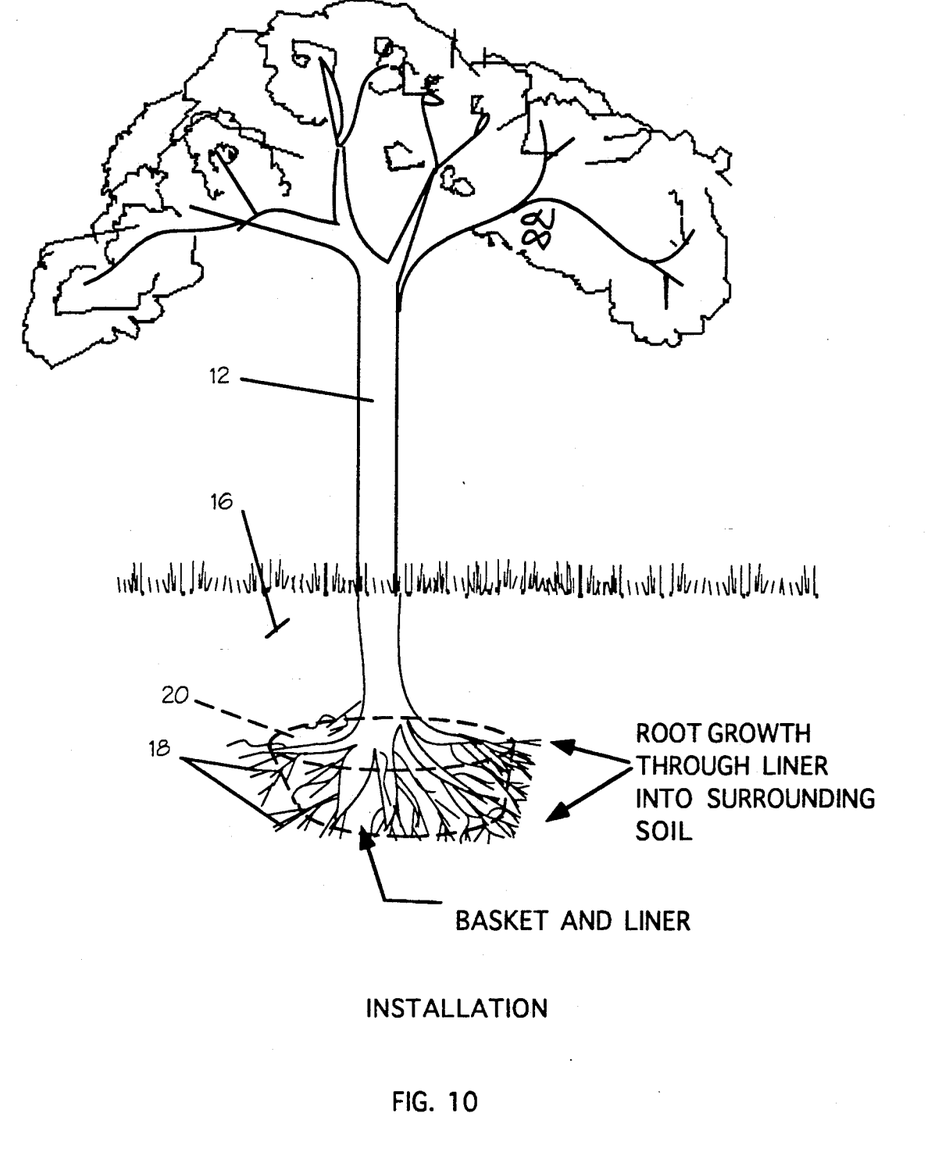
FIG. 10 is a view of the container of the invention after transplanting.

The container of the invention may be readily transplanted. The polyurethane liner 44, while resistant to rot, may be safely buried as the roots will readily grow through it, and the liner residue is non-toxic to plants and to the environment. If the container 30 is of the alternate form with a wooden base, it may still be buried; the base will rot, freeing the bottom roots. If the alternate form is of the synthetic bottom cloth form, the cloth 50 will have to be removed before transplanting, but this is a minor task, and the container 30 with liner 44 will still maintain the physical integrity of the root ball 20.

It should be apparent to those skilled in the art that the invention has disclosed a new and more useful plant container, which enhances root growth, resists rotting, and is readily moved and transplanted. It should be apparent that the invention is not limited to the specific embodiment shown in the drawings, but extends to the wider equivalents as claimed.

I claim:

1. A container for containing a growing plant within a root growth medium comprising:
   supporting means, having an open mesh construction, for supportably containing a root ball; and
   means for air pruning the roots of a plant in a root growth medium, said means further comprising a polyurethane liner, being permeable, rot-resistant and root-penetrable, surrounding said root growth medium within said supporting means; means, within said supporting means, for spacing said liner means for air flow about the bottom of said liner.

2. A container for containing a growing plant within a root growth medium comprising:
   supporting means, having an open mesh construction, for supportably containing a root ball; and
   means for air pruning the roots of a plant in a root growth medium, said means further comprising a polyurethane liner, being permeable, rot-resistant and root-penetrable, surrounding said root growth medium within said supporting means:
   said supporting means having a bottom and sides thereof;
   said liner means being conformable to the sides thereof;
   the supporting means bottom thereof being resistant to root growth;
   wherein said bottom is biodegradable;
   wherein said bottom consists of wood.

3. A container for containing a growing plant within a root growth medium comprising:

supporting means, having an open mesh construction, for supportably containing a root ball; and means for air pruning the roots of a plant in a root growth medium, said means further comprising a polyurethane liner, being permeable, rot-resistant and root-penetrable, surrounding said root growth medium within said supporting means;

said supporting means having a bottom and sides thereof;

said liner means being conformable to the sides thereof;

the supporting means bottom thereof being resistant to root growth;

wherein said bottom further resists root growth by cording roots.

4. The apparatus of claim 3 above wherein said bottom is a non-biodegradable material, having a plurality of small, non expandable openings.

5. The apparatus of claim 4 above wherein said non-biodegradable material is a tightly woven synthetic fiber cloth.

6. A container for containing a growing plant within a root growth medium comprising:

supporting means, having an open mesh construction, for supportably containing a root ball; and means for air pruning the roots of a plant in a root growth medium, said means further comprising a polyurethane liner, being permeable, rot-resistant and root-penetrable, surrounding said root growth medium within said supporting means;

said supporting means having a bottom and sides thereof;

said liner means being conformable to the sides thereof;

the supporting means bottom thereof being resistant to root growth;

wherein said bottom is black plastic sheet.

7. A container for containing a growing plant within a root growth medium comprising:

supporting means, having an open mesh construction, for supportably containing a root ball; and means for air pruning the roots of a plant in a root growth medium, said means further comprising a polyurethane liner, being permeable, rot-resistant and root-penetrable, surrounding said root growth medium within said supporting means;

said supporting means having a bottom and sides thereof;

said liner means being conformable to the sides thereof;

the supporting means bottom thereof being resistant to root growth;

wherein said bottom is a tarred felt.

8. A container for growing plants comprising in combination:

a basket having a bottom and sides thereof;

means for air pruning the roots of a plant supported by said basket, said means further comprising:

a polyurethane liner conformable to said basket, lining the interior thereof;

said liner enclosing a root ball of a plant;

said liner forming an air pruning surface between said root ball and the atmosphere, said basket further comprising:

said bottom comprising an interior, false bottom surface spaced a distance from the bottom of said basket;

said liner lining said false bottom surface and the sides of said basket;

said false bottom surface spacing said liner from the bottom of said basket for air circulation.

9. The apparatus of claim 8 further comprising:

means for supporting said false bottom a distance from said bottom under the weight of a root ball.

* * * * *